United States Patent
MacNeil et al.

(10) Patent No.: US 10,343,723 B2
(45) Date of Patent: Jul. 9, 2019

(54) MUD FLAP FOR ATTACHMENT TO A VEHICLE RUNNING BOARD

(71) Applicant: MacNeil IP LLC, Bolingbrook, IL (US)

(72) Inventors: David F. MacNeil, Fort Lauderdale, FL (US); Walter Malinowicz, Chicago, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 38 days.

(21) Appl. No.: 15/708,536

(22) Filed: Sep. 19, 2017

(65) Prior Publication Data

US 2019/0084622 A1    Mar. 21, 2019

(51) Int. Cl.
*B62D 25/16*    (2006.01)
*B62D 25/18*    (2006.01)

(52) U.S. Cl.
CPC ......... *B62D 25/182* (2013.01); *B62D 25/161* (2013.01); *B62D 25/163* (2013.01)

(58) Field of Classification Search
CPC .... B62D 25/16; B62D 25/161; B62D 25/163; B62D 25/168; B62D 25/18; B62D 25/182; B62D 25/186; B62D 25/188
See application file for complete search history.

(56) References Cited

U.S. PATENT DOCUMENTS 1,805,933 A    5/1931  Victor
1,809,711 A *  6/1931  Kile .................. B62D 25/18
                                            280/851
1,947,525 A    2/1934  Hume
(Continued)

FOREIGN PATENT DOCUMENTS

JP    04254267 A    9/1992
JP    05319311 A    12/1993
(Continued)

OTHER PUBLICATIONS

A web page for MKM CUSTOMS offering ICON Ford Raptor Quick Release Midflap System 2010-13 for sale, 2 pages, image downloaded on Sep. 19, 2017.

*Primary Examiner* — Katy M Ebner
(74) *Attorney, Agent, or Firm* — Perkins IP Law Group LLC; Jefferson Perkins (57) ABSTRACT

A mud flap is attachable to a selected group of through-holes of a vehicle running board. Plugs clamp to inclined surfaces of the through-holes, thereby firmly affixing a bracket portion of the integrally molded mud flap body to the running board. A flap portion of the mud flap body is connected to the bracket portion of the mud flap body only by a hinge portion. The hinge portion has a straight front surface, a straight rear surface and a thickness that is less than the overall thickness of the mud flap body. The flap portion has at least one wall portion that does not conform to any yz plane, stiffening the flap portion and inducing it to rotate around the hinge portion as a unit when a front-to-rear shear force impinges on the flap portion. A notch may be formed to interrupt an otherwise convexly curved rear flap portion surface so to receive a downwardly depending running board reinforcing member when the flap portion flexes out of its rest position.

11 Claims, 8 Drawing Sheets

(56) References Cited

U.S. PATENT DOCUMENTS

| | | | |
|---|---|---|---|
| 2,059,869 A | 11/1936 | Holecek | |
| 3,684,311 A | 8/1972 | Pierce | |
| 3,724,871 A * | 4/1973 | Evans | B62D 25/188 280/851 |
| 4,021,055 A * | 5/1977 | Okland | B60R 3/002 280/163 |
| 4,103,918 A * | 8/1978 | Salden | B62D 25/188 16/307 |
| D257,532 S | 11/1980 | Okland | |
| 4,257,620 A * | 3/1981 | Okland | B60R 3/002 280/164.1 |
| D260,253 S | 8/1981 | Waters, Jr. | |
| D261,133 S | 10/1981 | Makela | |
| 4,311,320 A | 1/1982 | Waters, Jr. | |
| 4,357,030 A * | 11/1982 | Verge | B62D 25/18 280/851 |
| 4,451,063 A | 5/1984 | Snyder | |
| 4,572,558 A * | 2/1986 | Chupick | B62D 25/161 280/850 |
| 4,696,507 A | 9/1987 | Alldredge | |
| 4,709,938 A | 12/1987 | Ward et al. | |
| 4,740,003 A * | 4/1988 | Antekeier | B62D 25/168 280/848 |
| 4,921,276 A | 5/1990 | Morin | |
| 4,928,994 A * | 5/1990 | Buchner | B62D 25/188 280/851 |
| 5,286,049 A | 2/1994 | Khan | |
| 5,375,882 A | 12/1994 | Koch, III | |
| 5,382,035 A | 1/1995 | Waddington et al. | |
| 5,489,108 A | 2/1996 | Slade | |
| 5,722,690 A | 3/1998 | Ward et al. | |
| D395,630 S | 6/1998 | Stanesic et al. | |
| 6,152,469 A * | 11/2000 | Gadowski | B62D 25/168 280/154 |
| 6,533,323 B1 | 3/2003 | Weaver | |
| 6,702,329 B1 | 3/2004 | Nishio | |
| 6,729,652 B2 * | 5/2004 | Cicansky | B62D 25/188 280/152.3 |
| 7,066,493 B2 * | 6/2006 | Cicansky | B62D 25/18 280/152.3 |
| 8,651,528 B2 | 2/2014 | Earl et al. | |
| 8,814,253 B1 * | 8/2014 | Butler | B62D 25/163 296/180.4 |
| 9,102,363 B2 * | 8/2015 | Atkinson | B62D 25/182 |
| 2008/0150273 A1 | 6/2008 | Sugiyama et al. | |

FOREIGN PATENT DOCUMENTS

| | | |
|---|---|---|
| JP | 07315251 A | 12/1995 |
| JP | 08119148 A | 5/1996 |
| JP | 09104366 A | 4/1997 |

* cited by examiner

MUD FLAP FOR ATTACHMENT TO A VEHICLE RUNNING BOARD

BACKGROUND OF THE INVENTION

It is known to fit mud flaps or splash guards behind the wheels of vehicles to protect the rest of the vehicle body from mud and debris that may be kicked up by the wheels. Conventionally, these mud flaps have been fitted to the interior surfaces of vehicle wheel wells. Recent mud flaps or splash guards usually are molded of a resilient polymer and are generally flexible. Little attempt has been made to provide a splash guard that will deflect around a predetermined hinge point, such as might happen if the lower edge of the mud flap encounters a rock or other upstanding obstacle. U.S. Pat. No. 8,651,528 to Earl discloses a wheel well-mounted splash guard in which a guard portion rotates around an axis when the guard portion hits a road obstacle. The axis is defined by intentional slots and gaps between neighboring walls of the molded splash guard.

Many light trucks and SUVs now come equipped with running boards, particularly where the passenger seats and foot wells are located at elevated positions. In the early $20^{th}$ Century, automobiles often had running boards, a structural feature that fell out of favor in the decades following. It was known to attach splash guards and similar depending items from the running boards of these early vehicles. U.S. Pat. No. 1,805,933 to Victor discloses a tire guard which could be affixed to a vehicle running board in front of the rear wheel, so as to sweep debris out of the way of the tire. This device was attached to the running board by means of a helical spring. U.S. Pat. No. 1,809,711 to Kile discloses a semirigid splash guard affixed to the underside of a running board in such a way that its angle could be adjusted by the user. U.S. Pat. No. 2,059,869 to Holecek discloses a ground-effect antenna formed as a portion of a flexible flap suspended from a running board. Despite these early devices, no one has provided a mud flap, integrally molded of a polymer, having rigidifying three-dimensional structure in its flap such as convex curved surfaces, attachable to a running board rather than to a wheel well, and including a hinge permitting the mud flap to deflect over road obstacles.

SUMMARY OF THE INVENTION

According to one aspect of the invention, a mud flap is provided for attachment to a vehicle running board. The mud flap body is integrally molded of a flexible polymer and includes a flap portion, a bracket portion and a hinge portion that is the flap portion's only connection to the bracket portion. The flap portion otherwise has no connection to the vehicle. The bracket portion is adapted to be affixed to the running board and includes a vertical member whose lower end terminates in the hinge portion. The hinge portion has a straight front surface and an opposed, straight rear surface spaced from the front surface by a predetermined hinge thickness. The hinge thickness is less than an overall thickness in the x direction of the mud flap body, the x direction being aligned to the direction of vehicle travel. An upper end of the flap portion is joined to the hinge portion. The mud flap body has a width in a y direction orthogonal to the x direction, and a height in a z direction that is at right angles to the x and y directions. At least one wall of the flap portion does not conform to any yz plane, so as to stiffen the flap portion. The flap portion therefore rotates as a unit around the hinge portion responsive to a shear force aligned to the x direction and impinging on the flap portion.

In one embodiment, the flap portion extends inboard beyond the inboard margin of the running board. The flap portion may have a generally rearwardly convex surface. A notch interrupts this convex surface to forwardly extend from it. The running board has a vertically disposed inboard reinforcing member. The notch is sized and positioned to receive the inboard reinforcing member of the running board when the flap portion rotates around the hinge portion responsive to a front-to-rear force impinging on the flap portion.

In a further aspect of the invention, a mud flap is provided for attachment to a vehicle running board having a plurality of through-holes. The body of the mud flap may be integrally molded of a polymer and includes a bracket portion and a flap portion. The bracket portion has a running board attachment member and a vertical member that downwardly extends from the running board attachment member. A plurality of bores are formed in the attachment member to extend from an upper surface thereof to a lower surface thereof. Each bore is aligned with a respective one of the through-holes in the running board. For each bore in the attachment member, a plug is also provided. The plug is closely received in a respective one of the through-holes. The plug has a bore that aligns with a bore in the attachment member. A respective fastener is inserted through the bore in the plug, through the through-hole in the running board, and into a respective bore in the attachment member to affix the mud flap to the running board.

In one embodiment, each of the used running board through-holes has a sidewall that is downwardly and inwardly sloped relative to its center. A downwardly and inwardly sloped peripheral sidewall of each plug mates with a respective one of these sidewalls. In one embodiment, where the running board is considered to be elongate in the x direction, the running board through-holes are separated from each other in a y direction that is horizontal and at right angles to the x direction. Each rank or group of running board through-holes may be raked in a rearward and outboard direction. In one embodiment, the through-holes (and the plugs) are noncircular, and can be elongate in the x direction.

In one embodiment, each fastener acts to clamp the running board attachment member to the running board through the downward and inwardly sloping sidewalls of the respective plug and the corresponding downward and inwardly sloping sidewall of the running board through-hole. This permits a firm attachment of the mud flap to the running board without rattling.

In one embodiment, the user selects one of several groups of running board through-holes that are spaced from each other in an x direction. The user attaches the mud flap to the selected through-hole group. The user may thereby adjust the fore-and-aft position of the mud flap to intercept the largest amount of spray or debris from the front vehicle tire behind which the mud flap is mounted. The mud flap of the invention may be used as an auxiliary mud flap, to catch splash and debris that is not caught by a wheel well mud flap installed in front of the running board mud flap. This optimizes and extends the protected area of the vehicle undercarriage.

BRIEF DESCRIPTION OF THE DRAWINGS

Further aspects of the invention and their advantages can be discerned in the following detailed description as read in conjunction with the drawings of exemplary embodiments, in which like characters denote like parts and in which.

DETAILED DESCRIPTION

Figures 1, 1A:
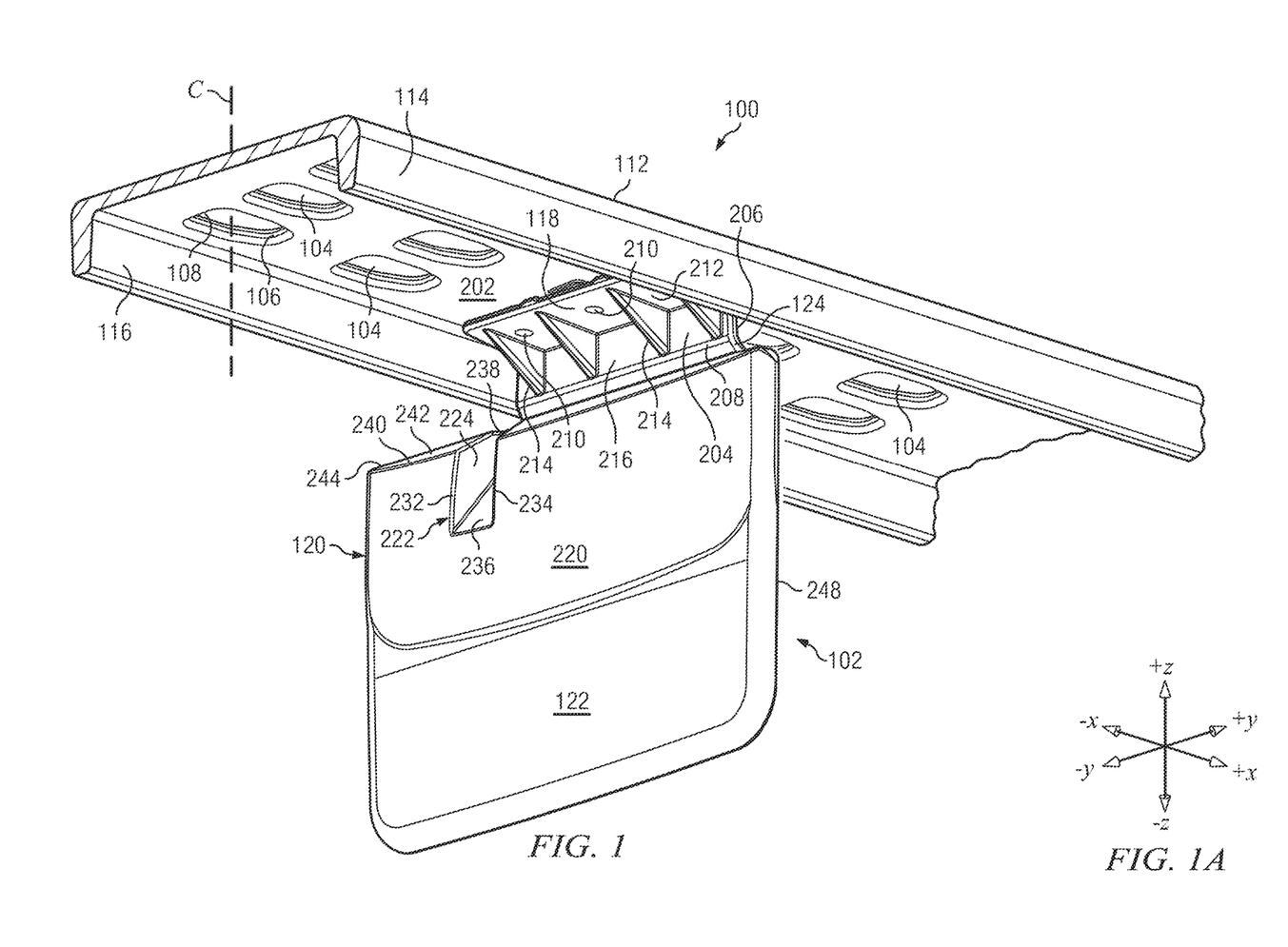
FIG. 1 is a perspective view of a mud flap according to one embodiment of the invention taken from a point of view that is below, outboard and to the rear of the mud flap, as affixed to a vehicle running board, fasteners having been omitted.
FIG. 1A is a diagram of a frame of reference used to describe the illustrated embodiment.

FIG. 1 shows a portion of a vehicle running board 100 that is affixed to the side of a vehicle, typically below the vehicle door and to the rear of the front vehicle wheel. For use in describing the invention, a frame of reference is provided in FIG. 1A. An x direction is parallel to the direction of travel of the vehicle and typically is horizontal. "+x" is forward; "−x" is rearward or aft. The x direction is longitudinal. A y direction is at right angles to the x direction and also typically is horizontal. "−y" is inboard; "+y" is outboard. The y direction is transverse. A z direction typically is vertical and is at right angles to the x and y directions. "+z" is above and "−z" is below.

A mud flap 102 is provided that is affixed to a selected group or rank of through-holes 104 that have been formed in the running board 100. The illustrated running board 100 is for the passenger's side of the vehicle. A +x or forward direction is generally toward the right of the paper while a −x or rearward direction is toward the left; an outboard or +y direction is generally to the right of the paper while an inboard or −y direction is generally to the left. A mud flap for the driver's side of the vehicle is formed in mirror image to the one shown.

In one commercial embodiment, the running board 100 has several groups or ranks of through-holes 104. In the illustrated embodiment, each rank has three through-holes 104 spaced from each other in a predominately y direction. The through-holes 104 in the illustrated embodiment are noncircular and are elongate in an x direction. In the illustrated embodiment, each through-hole 104 is somewhat arrow- or boat-shaped with a blunt tip 106 forward and a wider base 108 aft. Also in the illustrated embodiment, all of the through-holes 104 are identical in shape and in transverse spacing from each other. This makes possible the affixation of the mud flap 102 to any one of a plurality of the ranks of through-holes 104, at the option of the user. In the illustrated embodiment, the through-holes 104 are not aligned on a y axis but rather are raked outboard and toward the rear by about eight degrees from the y direction.

Alternatively, the running board 100 may be furnished with plural groups of through-holes 104, in which the arrangement of the two or more through-holes in the group is not linear (not shown). Also, in nonillustrated embodiments, the through-holes 104 may be circular or otherwise shaped differently from the through-holes shown.

The running board 100 is an original equipment manufacturer (OEM) piece and the through-holes 104 in it were designed mostly with aesthetics in mind. The through-holes 104 may vary in shape, size and number from one running board model to the next. Nonetheless, the invention has application to any running board having preexisting holes in it. The present invention takes advantage of the shape and position of these through-holes to attach a mud flap 102 to a vehicle at a position other than a wheel well, which relative to the mud flap 102 illustrated in FIG. 1 will be forward (to the right) of it.

The user affixes the mud flap 102 described herein to a position on the running board 100 that maximally intercepts splash and debris kicked up by the tire in front of it. The mud flap of the invention may be used as an auxiliary mud flap. In such a situation, a first mud flap (not shown) of a conventional type is affixed to the rear surface of the front wheel wheel well. This wheel well mud flap may have to have a relatively high ground clearance and as such won't be able to intercept spray and debris ejected at a relatively low angle from the front tire, spray and debris which therefore may continue and impact the vehicle undercarriage. The mud flap of the invention may be positioned by the user to intercept a further large fraction of this spray and debris before it impacts the vehicle undercarriage. Further, as will be detailed below, the mud flap of the invention does not have any inboard dimensional constraint as might otherwise be imposed by the vehicle wheel well, and as such can extend in an inboard direction by an amount that is equal to or greater than the width of the front vehicle tire, thereby protecting even more of the vehicle undercarriage.

Figure 2:
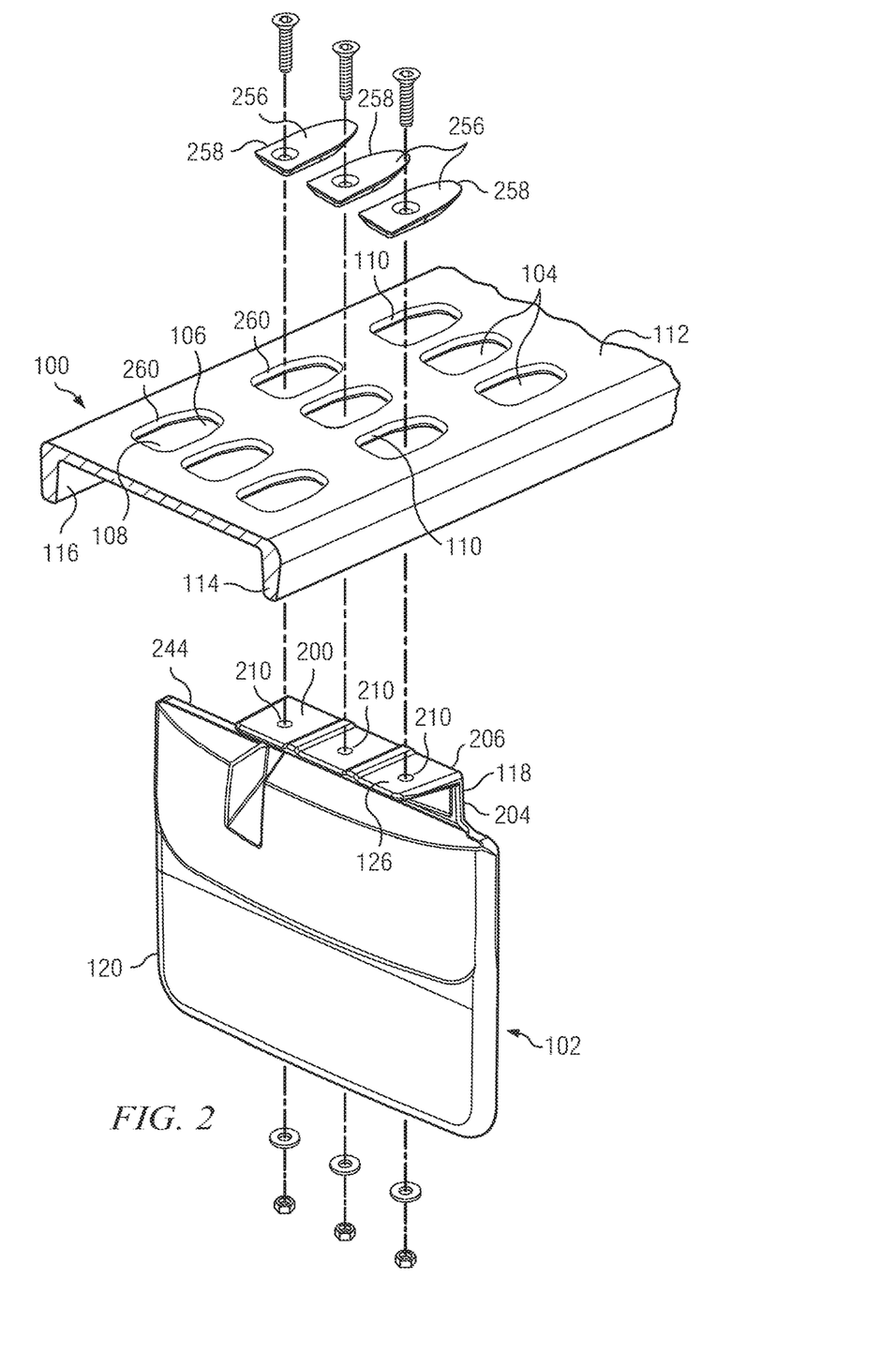
FIG. 2 is an exploded top perspective view of the mud flap shown in FIG. 1.
Figure 2A:
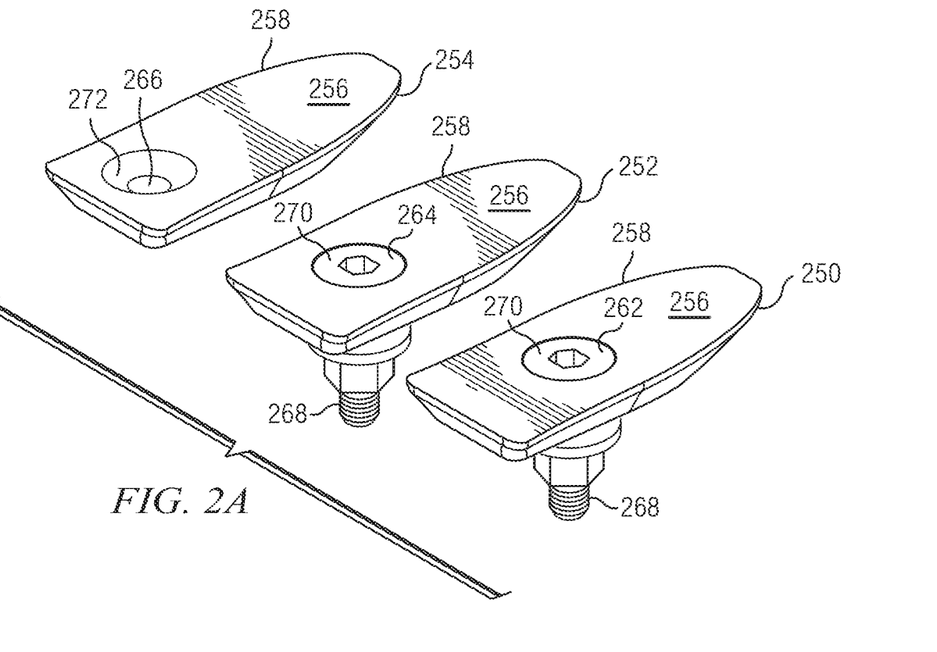
FIG. 2A is detail of FIG. 2 showing running board fastening plugs from a top and outboard perspective point of view.
Figure 2B:
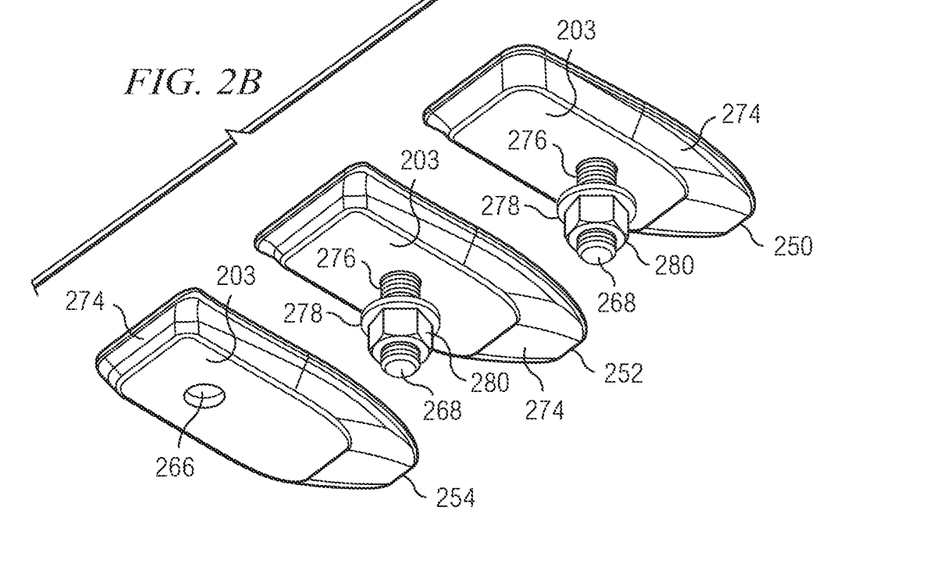
FIG. 2B is a perspective detail of the fastening plugs shown in FIG. 2A, from a bottom and outboard point of view.
Figures 3, 4:
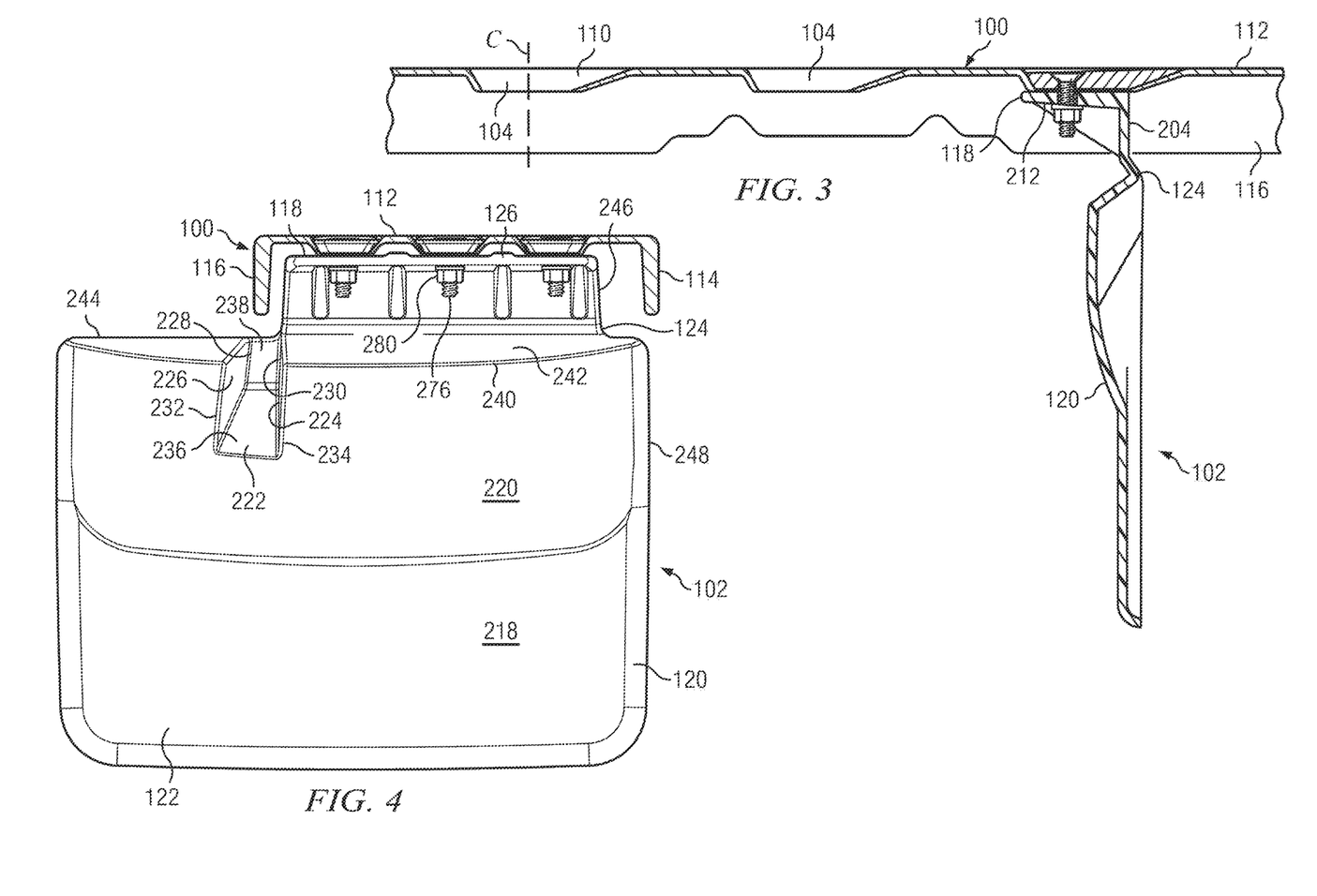
FIG. 3 is a longitudinal sectional view of the mud flap and a portion of a running board to which the mud flap is mounted.
FIG. 4 is a rear view of the mud flap as attached to the running board.

As seen in FIG. 2, each hole 104 has at least one sidewall 110 that may be somewhat convexly curved as seen from above and which slopes downwardly and inwardly with respect to its respective vertical center C (FIG. 3). The invention takes advantage of this sidewall shape. In the illustrated embodiment, the entire periphery of each running board through-hole 104 is formed by an endless, downwardly and inwardly convexly curved sidewall 110. Sidewall 110 alternatively could be linear in section and not curved, so that it slopes downward and toward the center C in planes. The sidewall 110 (FIG. 3) is at a considerable angle to the horizontal and its downwardly and inwardly extending shape is advantageously used as a clamping surface by mating sloping plug sidewall 274 (FIG. 2B).

The running board 100 has a horizontally disposed tread member 112 in which the groups of through-holes 104 are formed. To enhance its rigidity and load-bearing characteristics, the running board 100 further has an outboard vertical reinforcing member 114 that extends downwardly from an outboard margin of the tread member 112, and an inboard reinforcing member 116 that extends downwardly from an inboard margin of the tread member 112. Running board members 112, 114 and 116 form a downwardly hollow "C" channel which conveniently can be used to house an attachment bracket portion 118 of the mud flap body 120.

Figure 8:
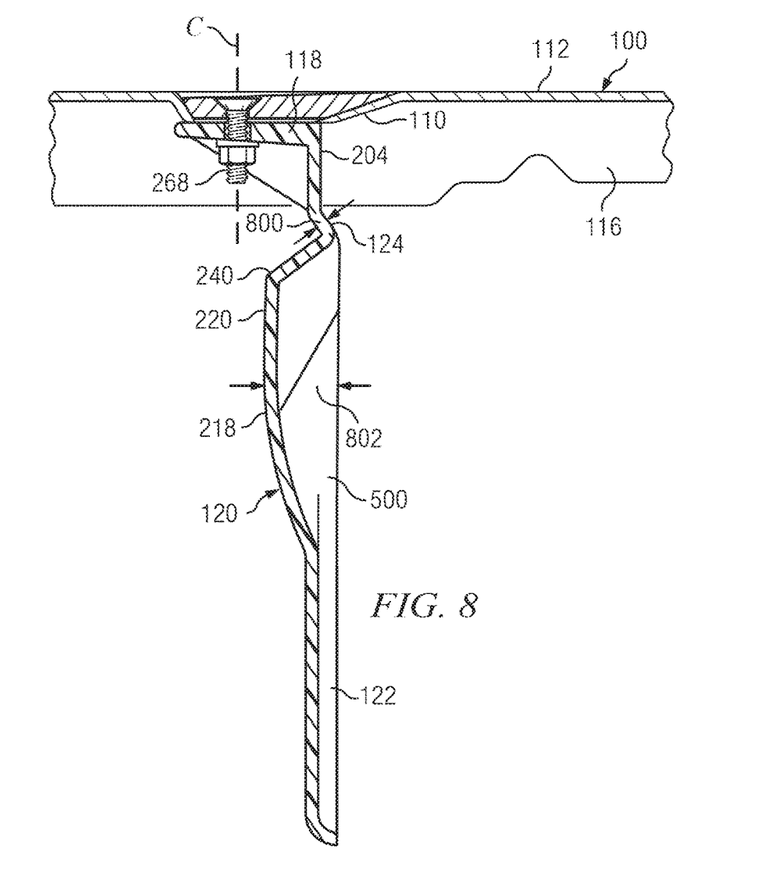
FIG. 8 is a longitudinal section of the mud flap taken through the mud flap hinge, showing the flap portion of the mud flap in an unflexed position.

In addition to the bracket portion 118, the mud flap body 120 has a flap portion 122 and, connecting the two together, a hinge portion 124 (FIG. 8). Flap portion 122 (FIG. 1) is connected to bracket portion 118 only by hinge portion 124, and otherwise is not connected to the rest of the mud flap body 120 or to the running board 100 or the rest of the vehicle. As seen for example in FIG. 6, the hinge portion 124 is straight, is of uniform xz cross section and in the illustrated embodiment is arranged along ay axis, or transversely of vehicle motion.

The bracket portion 118 has a horizontal plate 126 (FIG. 2) with a substantially flat upper surface 200 that, in use, abuts a lower surface 202 (FIG. 1) of the running board tread member 112 but may be slightly spaced from lower surfaces 203 of plugs 250, 252 and 254 (FIG. 2B). Plugs 250-254 can be slightly shallower than the depth of the holes 104 that they fill. A slight spacing between lower plug surfaces 203 and upper bracket surface 200 aids in the tightening or clamping of the mud flap 102 to the running board 100, so as to prevent rattling; all of the clamping force is exerted on the running board 100 instead of being partially relieved by a contact of the plug surfaces 203 with the attachment member upper surface 200.

A vertical plate 204 of the bracket portion 118 extends downwardly from a forward end 206 (FIGS. 2 and 6) of the horizontal plate 126. A lower end 208 (FIG. 6) of the vertical plate 204 is continuous with the thin hinge portion 124.

A plurality of through-holes 210 (FIG. 2) are formed from the upper surface 200 to a lower surface 212 (FIGS. 1 and 3) of the horizontal plate 126. In the illustrated embodiment, these through-holes 210 are three in number, are positioned in a line that is aligned to a transverse or y axis, and are regularly spaced apart from each other. The through-holes are vertical and their axes will pass through respective ones of a selected rank of running board through-holes 104.

The bracket vertical plate 204 should be rigid with respect to bracket horizontal plate 126. To this end, a plurality of triangular reinforcing gussets 214 (FIG. 6) may be furnished to be spaced apart from each other in a y direction and to be aligned to respective xz planes. The gussets extend from the lower surface 212 of the horizontal plate 126 to a rear surface 216 of the vertical plate 204. The gussets 214 may occupy respective positions intermediate the positions of the bracket through-holes 210 (FIG. 1), so that each bracket through-hole 210 is flanked by a pair of gussets 214.

As best seen in FIG. 4, the flap portion 122 of the mud flap body 102 has a rear surface 218 that, at least in part, is nonplanar. In the illustrated embodiment, an upper portion 220 of the rear surface 218 is convex in a rearward direction. However, the convex upper portion 220 is interrupted by a notch 222 that has an outboard, substantially vertical wall 224 and an inboard, substantially vertical wall 226 that is spaced in a y direction from the wall 224. In the illustrated embodiment, while walls 224 and 226 are mostly vertical, at least one of them is not completely so. From the rear to the front (that is, toward the front of the vehicle and forwardly from rear surface 218), the inboard wall 226 is canted in an outboard direction, such that its forward end 228 is closer to the forward end 230 of the outboard wall 224 than is the rearward end 232 of the inboard wall 226 to the rearward end 234 of the outboard wall 224. A floor 236 of the notch 222 extends between the inboard and outboard walls 226, 224, and may be upwardly and forwardly inclined when the flap portion 122 is in an unflexed condition. The inboard wall 226, outboard wall 224 and floor 236 may be terminated in a forward notch wall 238 that is substantially vertical and that is forwardly displaced from convex surface 220. A smallest width in the y direction of notch 222 should be larger than a largest width in the same direction of running board inboard reinforcing member 116.

In the illustrated embodiment, an upper end 240 of the convex portion 220 is terminated by a planar facet 242 that is upwardly and forwardly inclined. A portion of the forward end 244 of the facet 242 is joined to the hinge portion 124. The rest of forward end 244 is not connected to anything at all. Therefore, a width of the flap portion 122 in a y direction exceeds a width in the y direction of the bracket portion 118. In the illustrated embodiment a large part of the flap portion 122 is disposed inboard of the running board 100, so as to protect a larger portion of the lower surface of the vehicle from splash from the vehicle tire in front of the mud flap 102. As mounted rearward of a front tire, the mud flap 102 may protect the rearward portion of the running board 100, the rear axle, suspension components and the rear shock absorbers from mud, rocks and debris. The flap portion 122 also extends outboard relative to an outboard end 246 of bracket portion 118 and has an outboard end 248 that is in approximate vertical alignment with outboard running board reinforcing member 114.

The notch 222 and the convex portion 220 do not conform to any yz plane. The nonplanar sections of rear surface 218 of the flap portion 122 (and of the web of polymer that makes it up) lend rigidity to the flap portion 122. It will therefore have a tendency to angularly deflect as a unit around hinge portion 124 responsive to shear forces placed on it from either +x or −x directions.

The bracket portion 118 is affixed to the underside of the running board tread member 112 with the aid of a plurality of top plugs 250-254 (see FIGS. 2A and 2B) that each mate to a respective running board through-hole 104. In the illustrated embodiment, the running board through-holes 104 are identical to each other and their shapes do not vary by position or rank. Each of plugs 250-254 may therefore have an external shape that is identical to each other. In other embodiments, the number, size, position and shape of the plugs 250-254 may vary in concert with any variation in number, size, position or shape of the running board through-holes 104.

Preferably, each plug 250-254 has a flat, horizontal upper surface 256 with a periphery 258 that exactly matches a periphery 260 of any hole 104 as taken at the upper surface of the tread member 112. In this fashion, three holes 104 are filled in to create a substantially flat surface that does not accumulate dirt or water.

Each plug 250-254 has a through-hole (262, 264 or 266) for the receipt of the head of a fastener. Once assembled to the running board 100, the through-holes 262-266 will be aligned on a single y axis. But, since the running board through-holes 104 are raked rearwardly and outboard, the through-holes 262-266 are not formed at the same position in respective plugs 250-254. The plug through-hole 262 is at about the center of the top surface 256 of outboard plug 250. The plug through-hole 264 is shifted somewhat to the rear of the center of the top surface 256 of middle plug 252. Finally, the plug through-hole 266 is positioned even further rearward on top surface 256 of inboard plug 254. Positioning the plug through-holes 262-266 in this way permits the bracket through-holes 210 to be linear and on a y axis, making them easier to be formed in a single operation with a multiple-hole punch. The mud flap body 120 will therefore be aligned on a y axis, even where the running board through-holes 104 are not.

Each plug through-hole 262-266 is countersunk so as to house a fastener head. In the illustrated embodiment, the fasteners are cap screws 268 with heads 270 having frustoconical sides, and accordingly each through-hole 262-266 has a frustoconical surface 272 that extends downwardly and inwardly from upper plug surface 256. Surfaces 272 are so selected that the flat tops of the screw heads 270 are substantially coplanar with surfaces 256 once the mud flap 102 is installed on running board 100.

As best seen in FIG. 2B, each plug 250-254 has a concavely curved sidewall 274 that mates with a downwardly and inwardly convex sidewall 110 of a selected running board through-hole 104. The shafts 276 of the cap screws 268 are inserted through the running board holes 104 and through the bracket holes 210. The bracket 118 is secured to the running board 100 by threading washers 278 and nuts 280 onto the respective cap screws 268. The clamping pressure exerted by cap screws 268 and nuts 280 is transmitted by the nonvertical plug sidewalls to the respective nonvertical sidewalls 110 of through-holes 104. This permits the bracket 118 to be tightly attached to the running board 100 without rattling.

Figure 5:
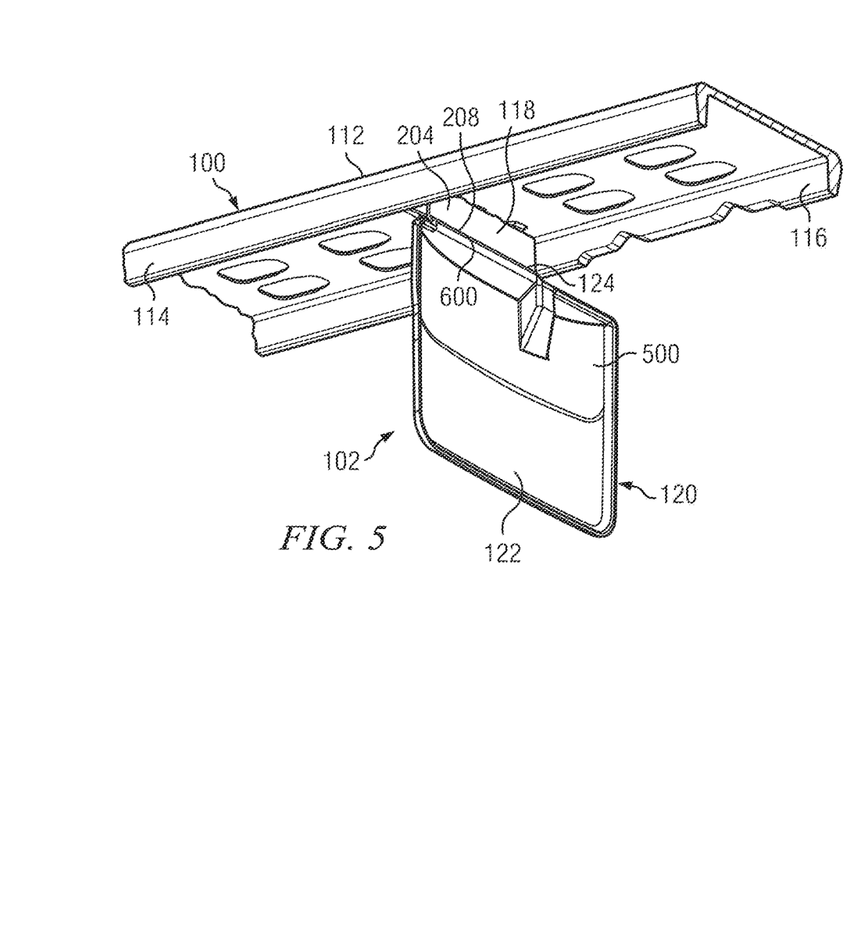
FIG. 5 is a perspective view of the mud flap and a portion of a running board taken from a point of view that is forward, beneath and outboard of the mud flap.

Portions 118, 122 and 124 of the mud flap 102 may be integrally molded out of a flexible polymer so that all parts preferably conform to a nominal thickness for best moldability. Therefore, a front surface 500 of the flap portion 122 (FIG. 5) may substantially conform in its shape to rear surface 218 thereof.

Figure 6:
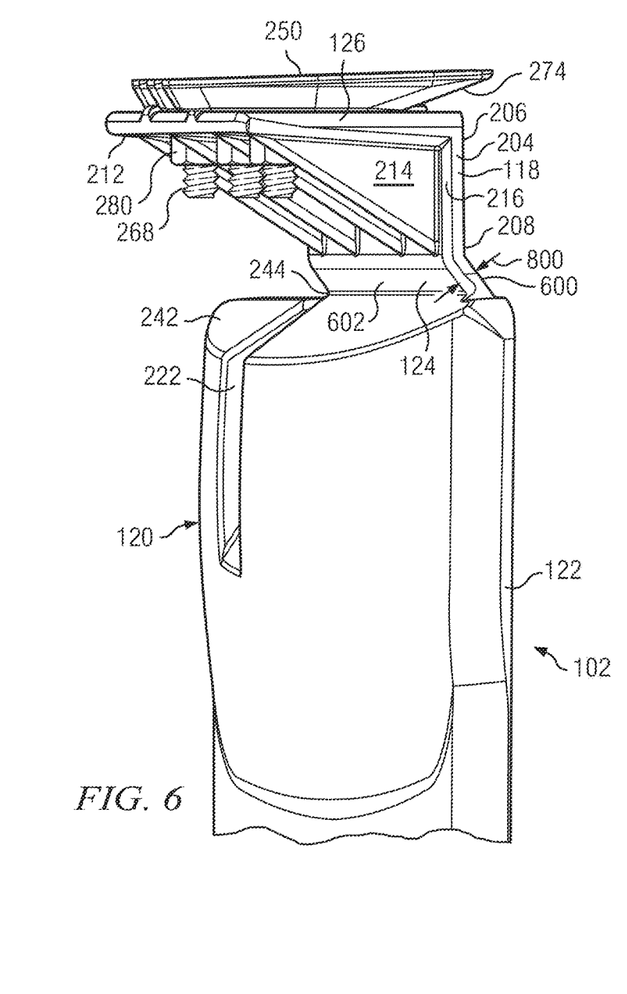
FIG. 6 is a rear outboard detail of the mud flap, the running board having been omitted.
Figure 7:
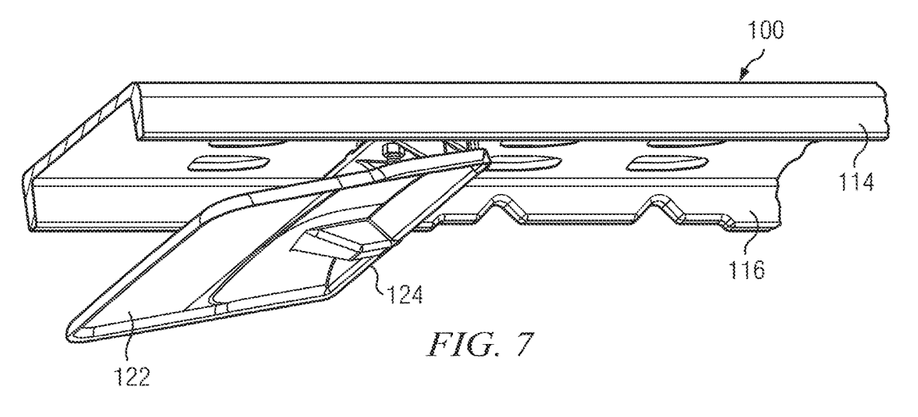
FIG. 7 is a bottom outboard perspective view of the mud flap and running board, showing a flap portion of the mud flap in a fully flexed position.

As seen in FIGS. 6 and 8, the hinge 124 has a uniform thickness 800 throughout its width (in a y direction), with the thickness being measured normal to the front and rear surfaces of hinge 124, that is much smaller than a greatest front-to-rear thickness 802 of flap portion 122. This difference in thicknesses encourages the flap portion 122 to rotate as a unit around hinge 124. Hinge 124 has a front surface 600 and, positioned in parallel to front surface 600 and displaced from it by the hinge thickness 800, a rear surface 602. The front and rear hinge surfaces 600, 602 are straight, flat rectangles that have widths far greater than their heights.

Figure 9:
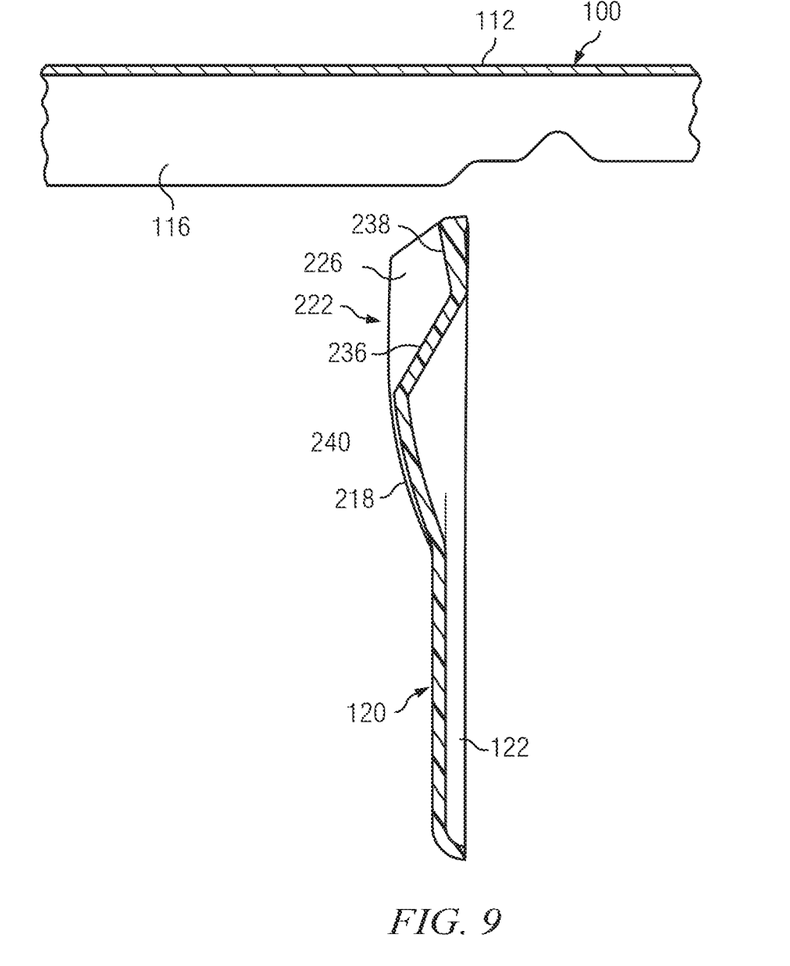
FIG. 9 is a longitudinal sectional detail similar to FIG. 8, but taken outboard of an inboard sidewall of a slot formed in the flap portion.
Figure 10:
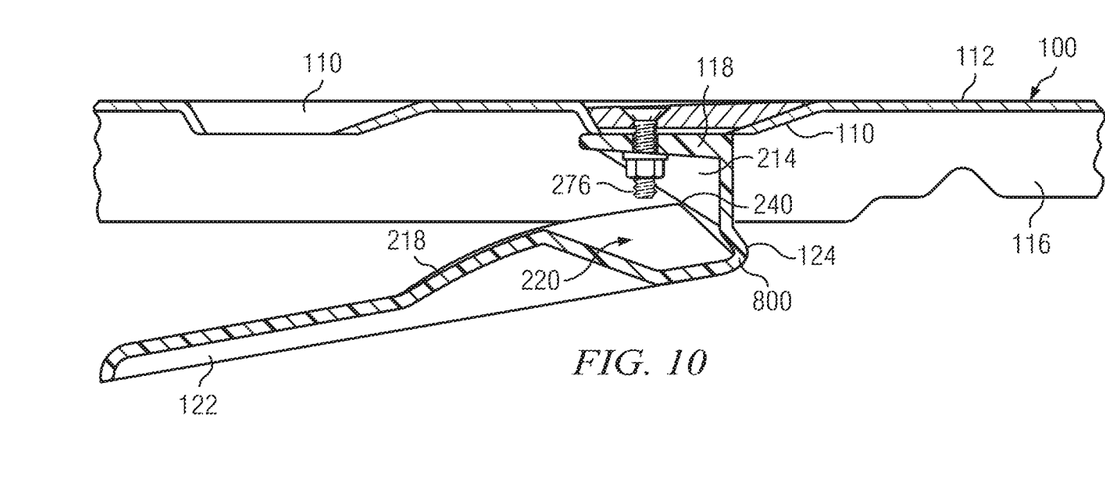
FIG. 10 is a longitudinal section taken along the same plane as FIG. 8, but showing the flap portion fully flexed.
Figure 11:
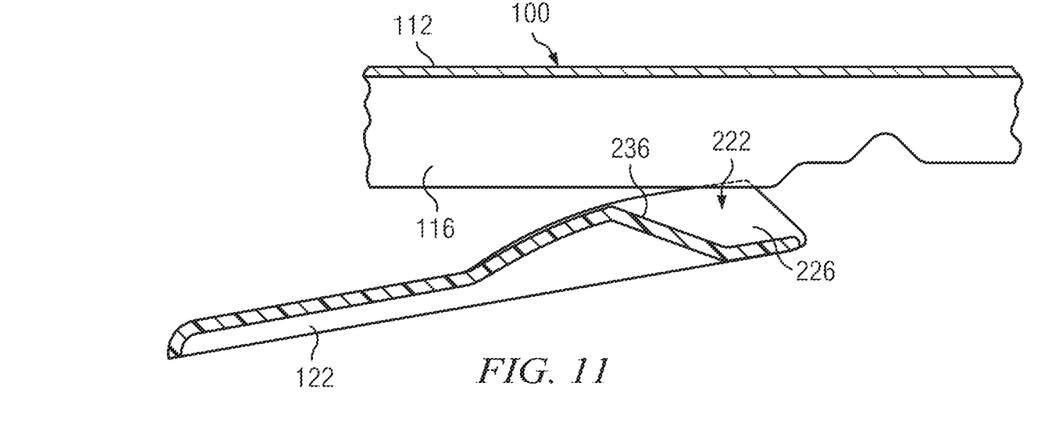
FIG. 11 is a longitudinal sectional detail taken along the same plane as FIG. 9, but showing the flap portion of the mud flap fully flexed.

FIGS. 10 and 11 show flap portion 122 in a fully rearwardly deflected position, as it would assume after hitting a sizable road obstacle at speed. FIG. 10 should be compared with FIG. 8, and FIG. 11 should be compared with FIG. 9. In the fully flexed position, the upper end 240 of convex portion 220 abuts a lower end 804 of each of the bracket gussets 214.

FIGS. 9 and 11 are taken in an xz plane inboard of bracket 118, and therefore the hinge 124 isn't visible in these views. When flap portion 122 reaches its fully flexed position, the inboard reinforcing member 116 of the running board 100 is partially received within notch 222. The notch 222 out of the convex portion 220 permits fuller flexure of the flap portion 122 than would otherwise occur. Hinge 124 is substantially elastic, such that after deflection the flap portion 122 returns to its unflexed, vertical position.

In summary, a mud flap for mounting on a running board has been shown and described. The mud flap takes advantage of preexisting plural holes in the running board so as to be securely mounted to the running board at a fore-and-aft location selected by the user, a location which can be optimized to intercept splash and debris not intercepted by a wheel well mud flap disposed in front of it. Top clamping plugs are provided to create a top surface that is substantially coplanar with a top surface of the running board tread member. A living hinge connects a bracket portion of the mud flap to a flap portion thereof, such that the flap portion will flex around the hinge responsive to shear force being placed on the flap portion.

While illustrated embodiments of the present invention have been described and illustrated in the appended drawings, the present invention is not limited thereto but only by the scope and spirit of the appended claims.

We claim:

1. A mud flap for attachment to a vehicle running board secured to an underside of a vehicle, the vehicle having a tire forward of the mud flap, the mud flap comprising:
   a body integrally molded of a flexible polymer, the body having a flap portion, a hinge portion and a bracket portion, the flap portion connected to the bracket portion only by the hinge portion of the body, the body having a height in a z direction, a width in a y direction at right angles to the z direction and an overall thickness in an x direction at right angles to they and z directions, the z direction being substantially vertical and the x direction being a direction of vehicle travel;
   the bracket portion adapted to be affixed to the vehicle running board and having a vertical member, a lower end of the vertical member terminating in the hinge portion;
   the hinge portion having a straight front surface and a straight rear surface spaced from the straight front surface by a hinge thickness that is less than the overall thickness of the flap portion; and
   an upper end of the flap portion joined to the hinge portion, wherein a width of the flap portion in a y direction is greater than a width in they direction of the hinge portion, the hinge portion having an inboard end, the flap portion extending inboard beyond the inboard end of the hinge portion, at least one wall of the flap portion not conforming to any yz plane so as to stiffen the flap portion, said at least one wall having a portion that is generally rearwardly convex with a the flap portion rotating around the hinge as a unit responsive to a shear force aligned to the x direction and impinging on the flap portion, the flap portion which extends beyond the hinge portion providing protection to said undersurface of said vehicle inward of said running board from splash and debris emanating from said vehicle tire.

2. The mud flap of claim 1, wherein the the rearwardly convex surface includes a notch that interrupts the rearwardly convex surface to forwardly extend from the rearwardly convex surface, a predetermined width of the notch in they direction, said notch being sized to receive a vertically disposed inboard reinforcing member of the running board when the flap portion rotates around the hinge portion responsive to a front-to-rear shear force impinging on the flap portion.

3. A mud flap for attachment to a vehicle running board, the running board having a plurality of through-holes, the mud flap comprising:
   a body integrally molded of a polymer, the body having a bracket portion and a flap portion;
   the bracket portion having a running board attachment member and a vertical member downwardly extending from the running board attachment member, the vertical member having a lower end, the flap portion of the body downwardly extending from the vertical member of the bracket portion;

the running board attachment member having an upper surface and an opposed lower surface, a plurality of bores formed in the running board attachment member to extend from the upper surface to the lower surface, each bore having an opening on the upper surface of the running board attachment member;

each bore of the attachment member opening onto a respective one of the through-holes of the running board, the mud flap further being provided with a plurality of plugs, each plug closely received in a respective one of the through-holes of the running board, each plug having a bore in alignment with a respective bore in the running board attachment member, for each plug, a fastener inserted through the bore of the plug and a respective bore in the attachment member in order to affix the mud flap to the running board.

4. The mud flap of claim 3, wherein each through-hole of the running board has a center, at least one sidewall of each of the through-holes in the running board being downwardly and inwardly sloped relative to the center of the respective through-hole, each plug having a downwardly and inwardly sloped peripheral sidewall that mates with the at least one sidewall of a respective one of the noncircular through-holes.

5. The mud flap of claim 4, wherein for each plug, a respective fastener exerts clamping pressure between the running board attachment member and the plug, the clamping pressure being exerted by the downwardly and inwardly sloped sidewall of the plug onto the at least one sidewall of the respective through-hole to tighten the attachment member to the running board without rattling.

6. The mud flap of claim 3, wherein each plug has a noncircular sidewall that mates with a noncircular sidewall of a respective running board through-hole.

7. The mud flap of claim 6, wherein an x direction is defined as the direction of vehicle travel, the running board being elongate in the x direction, each of the through-holes of the running board and each of the plugs being elongate in the x direction.

8. The mud flap of claim 3, wherein a y direction is defined to be horizontal and at right angles to the x direction, the bores in the running board attachment member being spaced from each other in they direction.

9. The mud flap of claim 3, wherein the running board has a plurality of through-hole groups spaced apart from each other in a direction of vehicle travel, the plugs being fitted into through-holes of a through-hole group selected by the user.

10. The mud flap of claim 3, wherein an x direction is parallel to a direction of vehicle travel and a z direction is vertical and at right angles to the x direction, the running board attachment member of the bracket portion of the mud flap body being a horizontal plate having a lower surface, the vertical member of the running board attachment member having a rearward surface, a plurality of spaced-apart triangular gussets aligned to respective xz planes and extending from the lower surface of the running board attachment member to the rearward surface of the vertical member of the bracket portion.

11. A mud flap for attachment to a vehicle running board secured to the undersurface of a vehicle, the vehicle having a tire disposed forward of said mud flap, the mud flap comprising:

a body integrally molded of a flexible polymer, the body having a flap portion, a hinge portion and a bracket portion, the flap portion connected to the bracket portion only by the hinge portion of the body, the body having a height in a z direction, a width in ay direction at right angles to the z direction and an overall thickness in an x direction at right angles to they and z directions, the z direction being substantially vertical and the x direction being a direction of vehicle travel;

the bracket portion adapted to be affixed to the vehicle running board and having a vertical member, a lower end of the vertical member terminating in the hinge portion;

the hinge portion having a straight front surface and a straight rear surface spaced from the straight front surface by a hinge thickness that is less than the overall thickness of the flap portion; and an upper end of the flap portion joined to the hinge portion, wherein a width of the flap portion in a y direction is greater than a width in they direction of the hinge portion, the hinge portion having an inboard and an outboard end, the flap portion extending beyond the inboard and outboard ends of the hinge portion, at least one wall of the flap portion not conforming to any yz plane so as to stiffen the flap portion, the flap portion having a generally rearwardly convex portion with a rearwardly convex surface, the flap portion rotating around the hinge as a unit responsive to a shear force aligned to the x direction and impinging on the flap portion, the flap portions which extends beyond the hinge portion providing protection to a rear undersurface of the running board and the undersurface of a vehicle inward of said running board from splash and debris emanating from said vehicle tire OR an expanded scope of protection to a rear undersurface of a vehicle inward of said running board from splash and debris emanating from said vehicle tire relative to a mud flap that is not provided with extended flap portions.

* * * * *